United States Patent
Diao et al.

(10) Patent No.: US 12,140,425 B2
(45) Date of Patent: Nov. 12, 2024

(54) FOUR-QUADRANT INTERFEROMETRY SYSTEM BASED ON AN INTEGRATED ARRAY WAVE PLATE

(71) Applicant: National Institute of Metrology, China, Beijing (CN)

(72) Inventors: Xiaofei Diao, Beijing (CN); Xinrui Fan, Beijing (CN)

(73) Assignee: National Institute of Metrology, China, Beijing (CN)

( * ) Notice: Subject to any disclaimer, the term of this patent is extended or adjusted under 35 U.S.C. 154(b) by 94 days.

(21) Appl. No.: 17/963,556

(22) Filed: Oct. 11, 2022

(65) Prior Publication Data
US 2023/0127285 A1 Apr. 27, 2023

(30) Foreign Application Priority Data
Oct. 27, 2021 (CN) .......................... 202111255151.8

(51) Int. Cl.
*G01B 9/02055* (2022.01)
*G01B 9/02015* (2022.01)

(52) U.S. Cl.
CPC ..... *G01B 9/02081* (2013.01); *G01B 9/02027* (2013.01); *G01B 2290/70* (2013.01)

(58) Field of Classification Search
CPC ............ G01B 9/02027; G01B 9/02081; G01B 2290/70
See application file for complete search history.

(56) References Cited

U.S. PATENT DOCUMENTS

| | | | | |
|---|---|---|---|---|
| 5,241,523 A | * | 8/1993 | Kessler | G11B 7/0917 369/44.41 |
| 6,304,330 B1 | * | 10/2001 | Millerd | G01N 21/45 356/521 |
| 2007/0115483 A1 | * | 5/2007 | Oak | G01B 11/303 356/600 |
| 2009/0091767 A1 | * | 4/2009 | Liang | G01B 11/26 356/493 |
| 2017/0108528 A1 | * | 4/2017 | Atlas | G01P 13/025 |

FOREIGN PATENT DOCUMENTS

CN 202770409 U * 3/2013

OTHER PUBLICATIONS

He, Chao et al. "A Stokes polarimeter based on four quadrant detector". J. Infrared Millim. Waves, vol. 35, No. 1, Feb. 2016, pp. 57-62. (Year: 2016).*

* cited by examiner

*Primary Examiner* — Michael A Lyons
(74) *Attorney, Agent, or Firm* — Hemisphere Law, PLLC; Zhigang Ma

(57) ABSTRACT

The invention discloses a four-quadrant interferometry system based on an integrated array wave plate. PBS splits an output laser light into two paths, the reflected light and the transmitted light are respectively transformed into reference light and measuring light, the reference light and the measuring light are converged in PBS, the converging light enters a signal receiving unit and is split into four beams, and the four beams irradiate on a four-quadrant interference signal detector with an integrated array wave plate. The invention solves the problems that the existing signal detection system occupies a large space, is not conducive to array integration, and cannot be used in scenes with high space and size requirements.

4 Claims, 1 Drawing Sheet

FOUR-QUADRANT INTERFEROMETRY SYSTEM BASED ON AN INTEGRATED ARRAY WAVE PLATE

BACKGROUND OF THE INVENTION

1. Field of the Invention

The invention relates to the field of interferometry, in particular to a four-quadrant interferometry system based on an integrated array wave plate.

2. Description of Related Art

Optical interferometry, as an important non-contact three-dimensional profile measurement method, has non-damage and high-efficiency characteristics; the optical interferometry has always been a research hotspot in the field of high-accuracy measurement at home and abroad for a long time, thereinto, single-frequency laser interferometry has attracted more and more attention in the field of industrial measurement because of its advantages of high measurement accuracy, fast speed, and easy array integration. In the process of measurement, errors may be caused by the change of light intensity when a two-channel receiver is used, and inconvenience may be caused by asymmetry when a three-channel receiver is used, therefore, to avoid the errors and the inconvenience, a four-channel photoelectric detector is widely used as the receiving unit of the interferometric signals, with the phase difference of 90° for any adjacent channels.

The existing four-channel receiving unit has the following problems in single-frequency laser interferometry: it occupies a large space, is not conducive to array integration, and cannot be used in scenes with high space and size requirements.

SUMMARY OF THE INVENTION

Given the above problems, the invention proposes a four-quadrant interferometry system based on an integrated array wave plate, so as to solve the problems that the existing four-channel receiving unit occupies a large space, is not conducive to array integration, and cannot be used in scenes with high space and size requirements.

The four-quadrant interferometry system based on an integrated array wave plate in the invention is composed of two parts: an interference unit and a signal receiving unit, wherein the interference unit comprises a laser, a polarizing beam splitter (PBS), two plane mirrors, and two quarter-wave plates; the signal receiving unit comprises a beam splitter, and a four-quadrant interference signal detector with an integrated array wave plate.

The four-quadrant interference signal detector with an integrated array wave plate is made up of three layers. The first layer of the structure is an integrated array wave plate, the second layer of the structure is a polarizer and the third layer of the structure is a four-quadrant photoelectric detector.

In some embodiments, a 633 nm single-mode fiber coupled red He-e laser is used as the laser generator.

In some embodiments, for the quarter-wave plate used in the interference unit of the four-quadrant interferometry system, the angle between the fast-axis direction and the polarization direction of PBS transmitted light is 45°.

In some embodiments, the beam splitter evenly splits an incident laser beam into four beams, with each beam having the same beam diameter, divergence angle, and wavefront as the incident laser beam.

In some embodiments, for the four-quadrant interference signal detector with an integrated array wave plate, UV curable adhesive is used to bind and fix layers together.

In some embodiments, the integrated array wave plate is 10 mm×10 mm×1 mm in size, and four different types of wave plates evenly distributed on it, with each type of wave plate being 5 mm×5 mm×1 mm in size.

In some embodiments, the polarizer is 10 mm×10 mm×1 mm in size.

The invention has the following advantages:

The four-quadrant interference signal detector with an integrated array wave plate can simultaneously receive four beam-splitting light paths in the same spatial position, greatly reducing the space occupied by the receiving unit, and facilitating array integration and application in some measurement scenes with high requirements for space and size.

For the four-quadrant interference signal detector with an integrated array wave plate, UV curable adhesive suitable for automatic operation because of its controllable bonding reaction is used to bind and fix layers together, with high bonding strength and excellent optical performance, with curing completed within one minute, and light transmittance greater than 90% after curing.

In the figures: 1 Laser, 2 Polarizing beam splitter (PBS), R3/T3 Quarter-wave plate, R4/T4 Plane mirror, 5 Beam splitter, 6 Four-quadrant interference signal detector with an integrated array wave plate, 7 Four-quadrant photoelectric detector, 8 Polarizer, 9 Integrated array wave plate, comprising a glass lens (LS1), a quarter-wave plate (LS2) with the fast-axis direction parallel to the polarization direction of PBS-transmitted light, a half-wave plate (LS3) with the fast-axis direction parallel to the polarization direction of PBS-transmitted light, and a quarter-wave plate (LS4) with the fast-axis direction perpendicular to the polarization direction of PBS-transmitted light; R is the reflected light path, and T is the transmitted light path; I is the interference unit, and II is the signal receiving unit.

DETAILED DESCRIPTION OF THE PREFERRED EMBODIMENTS

The detailed embodiments of the invention are clearly and completely described in the figures below. The embodiments described here are only part of the embodiments of the invention, not all of them. All other embodiments obtained by ordinary technicians in the field without creative labor, based on the embodiments of the invention, fall within the scope of protection of the invention.

Figure 1:
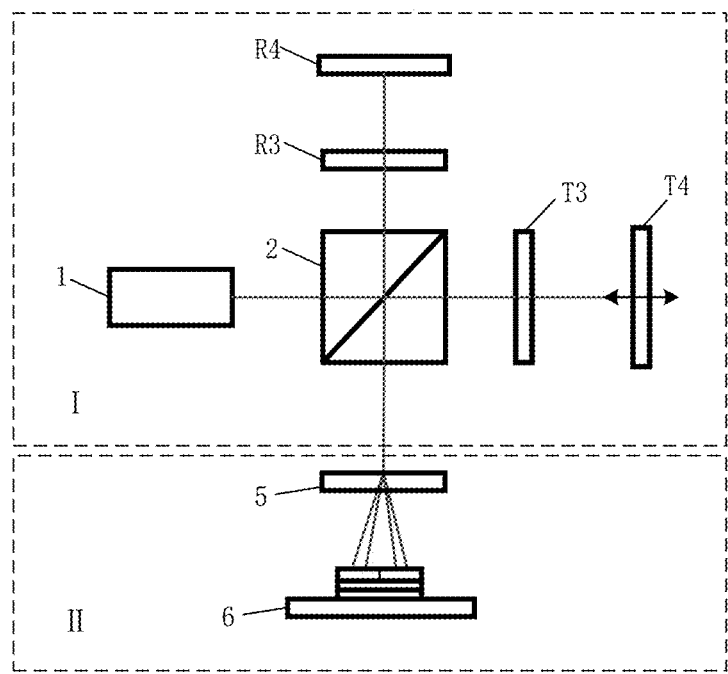
FIG. 1 is a schematic diagram of the four-quadrant interferometry system based on an integrated array wave plate in the invention.

FIG. 1 is a schematic diagram of the four-quadrant interferometry system based on an integrated array wave plate in the invention. The four-quadrant interferometry system based on an integrated array wave plate is composed of two parts: an interference unit I and a signal receiving unit II, wherein the interference unit I comprises a laser 1, a polarizing beam splitter (PBS) 2, two quarter-wave plates R3/T3 and two plane mirrors R4/T4; the signal receiving unit II comprises a beam splitter 5, and a four-quadrant interference signal detector 6 with an integrated array wave plate.

In FIG. 1, the x-axis direction is the polarization direction of PBS-transmitted light.

Figure 2:
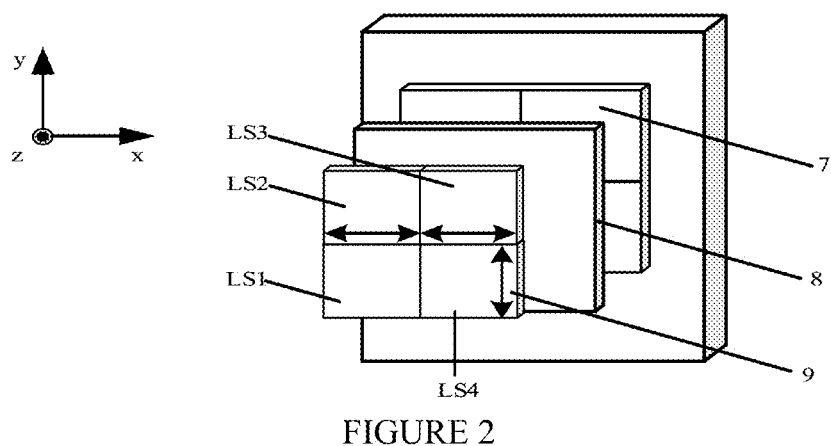
FIG. 2 is a structure diagram of the four-quadrant interference signal detector with an integrated array wave plate in the invention.

FIG. 2 is a structure diagram of the four-quadrant interference signal detector with an integrated array wave plate in the invention. The four-quadrant interference signal detector with an integrated array wave plate is made up of three layers. The first layer of the structure is an integrated array wave plate 9 comprising a glass lens LS1 of uniform size, a quarter-wave plate LS2 with the fast-axis direction parallel to the x-axis, a half-wave plate LS3 with the fast-axis direction parallel to the x-axis, and a quarter-wave plate LS4 with the fast-axis direction perpendicular to the x-axis; the second layer of the structure is a polarizer 8 with angle of 45° to the x-axis; the third layer of the structure is a four-quadrant photoelectric detector 7.

The specific working mode of the four-quadrant interferometry system based on an integrated array wave plate is as follows: the laser 1 in the interference unit I outputs a beam of linearly polarized light with the polarization angle of 45° to the x-axis, and the linearly polarized light is split by the polarizing beam splitter (PBS) 2 to obtain a beam of reflected light with the polarization direction parallel to the y-axis and a beam of transmitted light with the polarization direction parallel to the x-axis, the reflected light is transformed into circularly polarized light by the quarter-wave plate R3 with angle of 45° to the x-axis, the circularly polarized light is reflected by the plane mirror R4 and then transformed into reference light with the polarization direction parallel to the y-axis (the y-axis is obtained by rotating the x-axis counterclockwise by 90°) by the quarter-wave plate R3 with angle of 45° to the x-axis; the transmitted light is transformed into circularly polarized light by the quarter-wave plate T3 with angle of 45° to the x-axis, the circularly polarized light is reflected by the plane mirror T4 and then transformed into measuring light with the polarization direction parallel to the x-axis by the quarter-wave plate T3 with angle of 45° to the x-axis; the reference light and the measuring light are converged in the polarizing beam splitter (PBS) 2.

The converging light path in the polarizing beam splitter (PBS) 2 is received by the signal receiving unit II, and the converging light is split into four beams by the beam splitter 5 to irradiate on the four-quadrant interference signal detector 6 with an integrated array wave plate, specifically, the four beams respectively irradiate on the glass lens LS1, the quarter-wave plate LS2 with the fast-axis direction parallel to the x-axis, the half-wave plate LS3 with the fast-axis direction parallel to the x-axis, and the quarter-wave plate LS4 with the fast-axis direction perpendicular to the x-axis.

The reference light and the measuring light need to be adjusted to the same polarization direction to generate interference.

In some embodiments, a 633 nm single-mode fiber coupled red He-Ne laser is used as the laser generator.

In some embodiments, for the quarter-wave plate R3/T3 used in the interference unit I of the four-quadrant interferometry system based on an integrated array wave plate, the angle between the fast-axis direction and the x-axis is 45°.

In some embodiments, the beam splitter evenly splits an incident laser beam into four beams, with each beam having the same beam diameter, divergence angle and wavefront as the incident laser beam.

In some embodiments, for the four-quadrant interference signal detector 6 with an integrated array wave plate, UV curable adhesive is used to bind and fix layers together.

In some embodiments, the integrated array wave plate 9 is 10 mm×10 mm×1 mm in size, and four different types of wave plates evenly distributed on it, with each type of wave plate being 5 mm×5 mm×1 mm in size.

In some embodiments, the polarizer 8 with angle of 45° to the x-axis is 10 mm×10 mm×1 mm in size.

The above are only preferred embodiments of the invention, but the scope of protection of the invention is not limited to them. Any changes or substitutions that those skilled in the art can easily think of within the technical scope disclosed by the invention should be covered by the scope of protection of the invention. The scope of protection of the invention should be based on the scope of protection of the claims.

What is claimed is:

1. A four-quadrant interferometry system based on an integrated array wave plate, comprising two parts: an interference unit (I) and a signal receiving unit (II);
    wherein the interference unit (I) comprises a laser (1), a polarizing beam splitter (PBS) (2), two quarter-wave plates (R3/T3), and two plane mirrors (R4/T4); the signal receiving unit (II) comprises a beam splitter (5), and a four-quadrant interference signal detector (6);
    wherein the four-quadrant interference signal detector (6) comprises: the integrated array wave plate (9), a polarizer (8) with an angle of 45° to an x-axis, and a four-quadrant photoelectric detector (7), which are sequentially stacked and fixed in that order through a UV curable adhesive; and the integrated array wave plate (9) comprises: a glass lens (LS1), a quarter-wave plate (LS2) with a fast-axis direction parallel to the x-axis, a half-wave plate (LS3) with a fast-axis direction parallel to the x-axis, and a quarter-wave plate (LS4) with a fast-axis direction perpendicular to the x-axis;
    wherein the laser (1) is configured to output a laser light with a polarization angle of 45° to the x-axis; and the PBS (2) is configured to receive the laser light output from the laser (1), and split the laser light to obtain a reflected light with a polarization direction parallel to a y-axis and a transmitted light with a polarization direction parallel to the x-axis;
    wherein the quarter-wave plate (R3) is configured to receive the reflected light from the PBS (2) and transform the reflected light into a first circularly polarized light; the plane mirror (R4) is configured to receive the first circularly polarized light from the quarter-wave plate (R3) and reflect the first circularly polarized light to obtain a reflected first circularly polarized light; the quarter-wave plate (R3) is further configured to receive the reflected first circularly polarized light from the plane mirror (R4) and transform the reflected first circularly polarized light into a reference light with a polarization direction parallel to the y-axis;
    wherein the quarter-wave plate (T3) is configured to receive the transmitted light from the PBS (2) and transform the transmitted light into a second circularly polarized light; the plane mirror (T4) is configured to receive the second circularly polarized light from the quarter-wave plate (T3) and reflect the second circularly polarized light to obtain a reflected second circularly polarized light; and the quarter-wave plate (T3) is further configured to receive the reflected second circularly polarized light from the plane mirror (T4) and transform the reflected second circularly polarized light into a measuring light with a polarization direction parallel to the x-axis;

wherein the PBS (2) is further configured to receive the reference light from the quarter-wave plate (R3) and the measuring light from the quarter-wave plate (T3), and converge the reference light and the measuring light to obtain a converging light; and wherein the beam splitter (5) is configured to receive the converging light from the PBS (2), and split the converging light into four beams to respectively irradiate on the glass lens (LS1), the quarter-wave plate (LS2) with the fast-axis direction parallel to the x-axis, the half-wave plate (LS3) with the fast-axis direction parallel to the x-axis, and the quarter-wave plate (LS4) with the fast-axis direction perpendicular to the x-axis.

2. The four-quadrant interferometry system based on the integrated array wave plate according to claim 1, wherein the laser (1), the PBS (2), the quarter-wave plate (T3) of the two quarter-wave plates (R3/T3), and the plane mirror (T4) of the two plane mirrors (R4/T4) are sequentially arranged in that order along the x-axis; the four-quadrant interference signal detector (6), the beam splitter (5), the PBS (2), the quarter-wave plate (R3) of the two quarter-wave plates (R3/T3) and the plane mirror (R4) of the two plane mirrors (R4/T4) are sequentially arranged in that order along the y-axis; and fast-axis directions of the quarter-wave plate (T3) and the quarter-wave plate (R3) are disposed with an angle of 45° to the x-axis respectively; and wherein the integrated array wave plate (9) of the four-quadrant interference signal detector (6) is disposed between the beam splitter (5) and the polarizer (8) of the four-quadrant interference signal detector (6).

3. The four-quadrant interferometry system based on the integrated array wave plate according to claim 1, wherein the beam splitter (5) is configured to split the converging light into four beams with same beam diameter, divergence angle and wavefront as the laser light output by the laser (1) to respectively irradiate on the glass lens (LS1), the quarter-wave plate (LS2) with the fast-axis direction parallel to the x-axis, the half-wave plate (LS3) with the fast-axis direction parallel to the x-axis, and the quarter-wave plate (LS4) with the fast-axis direction perpendicular to the x-axis.

4. A four-quadrant interferometry system, comprising: an interference unit (I) and a signal receiving unit (II);

wherein the interference unit (I) comprises: a laser (1), a PBS (2), a quarter-wave plate (T3) with an angle of 45° to an x-axis, and a plane mirror (T4), which are sequentially disposed in that order along the x-axis; and the interference unit (I) further comprises: a quarter-wave plate (R3) with an angle of 45° to the x-axis and a plane mirror (R4), which are sequentially disposed in that order along a y-axis; and the PBS (2) is disposed at a side of the quarter-wave plate (R3) facing away from the plane mirror (R4);

wherein the signal receiving unit (II) comprises: a beam splitter (5), and a four-quadrant interference signal detector (6); and the four-quadrant interference signal detector (6), the beam splitter (5), the PBS (2), the quarter-wave plate (R3), and the plane mirror (R4) are sequentially arranged in that order along the y-axis;

wherein the four-quadrant interference signal detector (6) comprises three layers; a first layer of the three layers of the four-quadrant interference signal detector (6) is an integrated array wave plate (9); a second layer of the three layers of the four-quadrant interference signal detector (6) is a polarizer (8) with an angle of 45° to the x-axis; and a third layer of the three layers of the four-quadrant interference signal detector (6) is a four-quadrant photoelectric detector (7); and the integrated array wave plate (9), the polarizer (8), and the four-quadrant photoelectric detector (7) are sequentially stacked and fixed in that order through a UV curable adhesive;

wherein the integrated array wave plate (9) comprises: a glass lens (LS1), a quarter-wave plate (LS2) with a fast-axis direction parallel to the x-axis, a half-wave plate (LS3) with a fast-axis direction parallel to the x-axis, and a quarter-wave plate (LS4) with a fast-axis direction perpendicular to the x-axis; and wherein the beam splitter (5) is configured to receive a converging light from the PBS (2), and split the converging light into four beams to respectively irradiate on the glass lens (LS1), the quarter-wave plate (LS2) with the fast-axis direction parallel to the x-axis, the half-wave plate (LS3) with the fast-axis direction parallel to the x-axis, and the quarter-wave plate (LS4) with the fast-axis direction perpendicular to the x-axis.

\* \* \* \* \*